United States Patent [19]

Auracher et al.

[11] Patent Number: 4,746,195
[45] Date of Patent: May 24, 1988

[54] METHOD FOR ADJUSTING COUPLING OPTICS AND THE END OF A WAVEGUIDE RELATIVE TO A SEMICONDUCTOR LASER

[75] Inventors: Franz Auracher, Baierbrunn; Rudolf Keil, Munich; Julius Wittmann, Deisenhofen; Hans-Ludwig Althaus, Lappersdorf; Gerhard Kuhn, Alteglofsheim, all of Fed. Rep. of Germany

[73] Assignee: Siemens Aktiengesellschaft, Berlin and Munich, Fed. Rep. of Germany

[21] Appl. No.: 711,415

[22] Filed: Mar. 13, 1985

[30] Foreign Application Priority Data

Apr. 11, 1984 [DE] Fed. Rep. of Germany ....... 3413667

[51] Int. Cl.$^4$ .......................... G02B 6/00; H01S 3/18; G01B 11/00
[52] U.S. Cl. ................................ 350/320; 350/96.17; 350/96.20; 250/227; 372/43; 372/49; 372/109; 356/400
[58] Field of Search ............... 350/96.10, 96.15, 96.17, 350/96.18, 96.20, 320; 250/227; 356/399, 400, 401; 372/6, 43, 49, 109; 357/17, 19

[56] References Cited

U.S. PATENT DOCUMENTS

| | | | |
|---|---|---|---|
| 3,704,996 | 12/1972 | Borner et al. | 350/96.20 X |
| 3,952,265 | 4/1976 | Hunsberger | 357/19 X |
| 4,167,744 | 9/1979 | Nyul | 357/17 |
| 4,202,000 | 5/1980 | Carballes | 357/19 |
| 4,394,061 | 7/1983 | Schroeder | 350/96.20 |
| 4,637,683 | 1/1987 | Asawa | 350/320 X |
| 4,673,244 | 6/1987 | Miles | 350/96.20 |
| 4,679,908 | 7/1978 | Goodwin | 350/320 |
| 4,702,556 | 10/1987 | Ishii et al. | 350/320 |

FOREIGN PATENT DOCUMENTS

| | | | |
|---|---|---|---|
| 56-30111 | 3/1981 | Japan | 350/96.20 |
| 58-158619 | 9/1983 | Japan | 356/401 |
| 59-61809 | 4/1984 | Japan | 350/96.17 |

OTHER PUBLICATIONS

Bailey et al, "Method and Apparatus to Align and Affix an Optical Fiber ... L.E.D.", Xerox Tech. Discl., vol. 4, No. 3, May/Jun. 79, pp. 387–388.

Primary Examiner—William L. Sikes
Assistant Examiner—Brian M. Healy
Attorney, Agent, or Firm—Hill, Van Santen, Steadman & Simpson

[57] ABSTRACT

A method and apparatus for positioning a laser diode with respect to a coupling optic for a waveguide to obtain the optimum light transmission characterized by providing a reflecting reference plane or surface extending perpendicular to the axis of the waveguide adjacent the coupling optic, projecting light through the waveguide and coupling optic onto the reflecting surface, measuring the amount of light reflected into the waveguide and adjusting the axial position of the waveguide and optic relative to the reflecting surface to obtain the optimum value, then placing the semiconductor with the facet in the reference plane and either operating the semiconductor to provide light for coupling into the waveguide and adjusting the relative positions in a transverse plane to the axis of the waveguide to obtain the optimum transmission or operating the semiconductor laser as a detector and coupling light into the waveguide at a point spaced from the laser to project into the detector and making adjustments in the transverse direction to obtain the optimum reading. The reflecting surface can be either a separate reflecting device or the facet of the laser. The apparatus includes two members each having an abutting surface with one of the members positioning the waveguide with the coupling optic to lie along an axis perpendicular to the abutting surface and the other member positioning the semiconductor laser with the facet lying in the plane of the abutting surface.

8 Claims, 4 Drawing Sheets

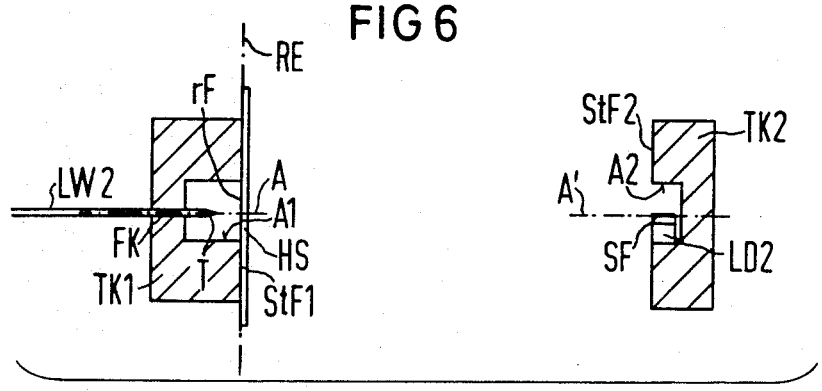
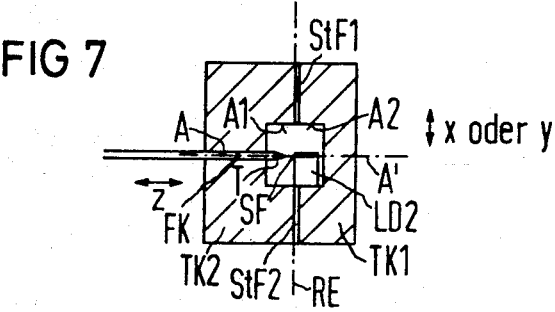

METHOD FOR ADJUSTING COUPLING OPTICS AND THE END OF A WAVEGUIDE RELATIVE TO A SEMICONDUCTOR LASER

BACKGROUND OF THE INVENTION

The present invention is directed to a method for adjusting coupling optics for coupling light into a waveguide, which coupling optics are provided at the end of an optical waveguide to couple light from a semiconductor laser. The method includes establishing the longitudinal spacing along the optical axis of the waveguide between the end of the waveguide having the coupling optics and the semiconductor laser and adjusting the position of the waveguide and coupling optics relative to the semiconductor laser in an x and y direction which lie in a plane extending perpendicular to the optical axis to obtain the optimum and maximum value of light coupling between the laser and waveguide. The invention is also directed to an apparatus used for the implementation of the method.

Given the construction of transmission modules with monomode fibers, the coupling optics are composed of a fiber taper with a refractive lens and must be adjusted and subsequently fitted with reference to the laser diode in a longitudinal direction z, which is along the optical axis of the waveguide. In addition, the monomode fiber and coupling optics must be adjusted relative to the laser diode in two mutually orthogonal directions x and y which lie in a plane which is perpendicular to the longitudinal direction z.

Given all known module construction technologies with coupling optics which have a lens at the end of the fiber, the fiber is adjusted to a maximum coupling efficiency and is then fixed in this position. The adjustment to the maximum coupling efficiency occurs by means of measuring a light power coupled via the coupling optics at the end of the fiber into the fiber itself. Since, in practice, the adjustment in longitudinal direction z is not independent of the adjustments in the transverse directions x or y, the optimum fiber position can only be found step-by-step by means of alternately adjusting in both the longitudinal direction and adjustment in the transverse directions. Thus, the fixing is relatively tedious and time-consuming.

The fixing of the fiber usually occurs by means of soldering for reasons of long-time stability. In order to be able to operate an InGaAsP/InP laser, with the temperatures occurring for soldering, the laser would have to be cooled during the soldering process or be constructed to be thermally insulated from the solder location.

SUMMARY OF THE INVENTION

The present invention is directed to a method of a type for positioning the end of a waveguide relative to a semiconductor laser, which adjustment can be carried out given an inactive laser, i.e., a laser not functioning as a laser transmitter. The coupling optics between the waveguide end and the semiconductor laser can consist of a fiber lens or one or more discrete lenses (e.g. ball lenses, GRIn-rod lenses, classical spherical lenses etc). In addition, the present invention is directed to an apparatus utilized in obtaining the desired adjustments.

To accomplish these goals, the present invention is directed to an improvement in a method for adjusting coupling optic, which is provided at the end of the optical waveguide relative to a semiconductor laser so that the laser light emitted by the semiconductor laser is coupled into the waveguide via the coupling optic with an optimum coupling efficiency. The method includes the steps of longitudinally adjusting the position of the coupling optic relative to the semiconductor laser to obtain the longitudinal spacing along the optical axis of the waveguide at the coupling optic adjacent the semiconductor laser as well as a step of transverse adjusting in x and y direction lying in a plane perpendicular to the optic axis, said adjusting steps each including coupling light into the waveguide, measuring the light power of the coupled light, and moving the waveguide and coupling optic relative to the laser to obtain an optimum and particularly maximum measured value. The improvements comprising performing the longitudinal adjusting step and the transverse adjusting step independently of each other, wherein said longitudinal adjusting step includes providing a reference plane extending perpendicular to the optical axis of the waveguide and coupling optic, providing a reflecting surface in the reference plane, projecting light from the waveguide through the coupling optic onto the reflecting surface with the light traveling in a path perpendicular to the reference plane and reflecting surface, measuring the intensity or light power of the light reflected by the reflecting surface and coupled back into the waveguide via the coupling optic, positioning the coupling optic and waveguide axially relative to the reference plane and along a perpendicular direction to the reference plane to obtain the optimum measurement, and after obtaining the optimum measurement setting or fixing the longitudinal spacing; and wherein the step of transverse adjusting in the x and y or orthogonal directions in the plane parallel to the reference plane includes coupling light into the optical waveguide and the coupling optic, providing a detector for detecting the light power or intensity of the light traveling in the waveguide, and moving the coupling optic in both orthogonal or x and y directions relative to the laser to obtain the optimum maximum value for the intensity of the light. Preferably, the second step of transverse adjusting can either use the semiconductor laser to operate to be the light source for coupling the light into the optical waveguide through the coupling optic or light can be coupled into the waveguides at an opposite end to be projected through the coupling optics onto the semiconductor laser which is operated in a passive mode as a detector. The advantages of the present invention are that the adjustment of the longitudinal spacing and the transverse directions can each be done independent of the other so that the optimum fiber position is obtained.

As a consequence of the mutually independent adjustments to the optimum longitudinal spacing and to the optimum relative transverse adjustments, the adjustments of the coupling optics to the semiconductor laser is considerably simplified in comparison to previous adjustments wherein the adjustment in the longitudinal direction and the adjustment in the transverse direction were dependent on one another so that the optimum fiber position could only be found step-by-step by means of alternately adjusting in both the longitudinal direction and the transverse direction. Given the inventive method recited hereinabove, the hereto required readjustment of the fiber of the coupling optics in the transverse direction is eliminated during the adjustment of for optimum longitudinal spacing. The preadjustment of the fiber and the coupling optics in a longitudinal direction is advantageously possible on a sub-carrier. The sub-carrier for the semiconductor laser and the sub-carrier for the fiber need only be brought into contact with the corresponding reference surfaces and then be adjusted in a transverse direction.

The inventive method as recited hereinabove is based on the perception that the dependency of the light power returned by the semiconductor laser particularly reflecting back and coupled into the waveguide via the coupling optics from the longitudinal spacing between the end of the coupling optics fixed relative to the waveguide and the semiconductor laser in the longitudinal direction z of the waveguide is comparable to the corresponding dependency in the longitudinal direction z of the coupling efficiency between the semiconductor laser and the coupling optics. Particularly, this is true when utilizing a fiber taper with a lens.

Given the adjustment of the coupling optics in the transverse direction, the light power coupled via the coupling optics into the waveguide of the laser and thus the electrical signal supplied by the laser during a detecting mode is maximum when the coupling optics is optimally adjusted with reference to the semiconductor laser. The adjustment characteristics, i.e., the light power coupled in as a function of the displacement of the coupling optics in a transverse direction coincide with the adjustment characteristics for interfacing.

In particular, it is pointed out that the method of the invention enables a complete, optical adjustment of the optical coupling or, respectively, of the waveguide to the semiconductor laser entirely without operation of the semiconductor laser as a laser transmitter. When utilizing the embodiment of the invention where the semiconductor laser is passively operated, it then acts as a detector.

The inventive adjustment according to the method as recited hereinabove is simple and problem-free particularly because the fiber or, respectively, the light waveguide can be optimally adjusted given an inactive semiconductor laser. Thus, the adjustment can be made without the laser being operated in a laser mode or without operation of the semiconductor laser as a transmitter.

Additional advantages are expediently obtained from the preferred developments by longitudinally adjusting to the optimum longitudinal spacing first and then transverse adjusting to the optimum transverse position.

If the method utilizes an auxiliary reflecting surface being disposed in a reference plane while obtaining the optimum longitudinal spacing, then the method includes removing this reflecting auxiliary surface after obtaining the optimum longitudinal spacing and then disposing a facet of the semiconductor laser in the reference plane in place of the auxiliary reflecting surface. Then the step of obtaining the optimum transverse settings is undertaken utilizing the semiconductor laser. It is also possible to use the facet of an inactive semiconductor laser as the reflecting surface and thus to place the facet of the semiconductor laser in the reference plane and to maintain it there during both the longitudinal adjusting and for the transverse adjusting steps.

When the semiconductor laser is passively operated as a detector during the transverse adjusting step, it is desirable that the light being supplied through the waveguide and coupled out from the coupling optics has a longer wavelength than the laser light emitted by the semiconductor laser when actively operated as a laser. Thus, a light source with a longer wavelength than the wavelength of the light emitted by the semiconductor laser is coupled to the opposite end of the waveguide so that the light of the longer wavelength will be conducted through the waveguide, the coupling optics to the semiconductor laser.

When light of a longer wavelength is utilized and conducted through the optical fiber or waveguide during the adjustment steps, it is preferably from another laser which is coupled to the opposite end of the waveguide.

The inventive method with the passively operated semiconductor laser preferably occurs as follows. The adjustment in a transverse direction relative to the optical axis will occur utilizing light having a longer wavelength than the laser light of the semiconductor laser when operated actively as a laser. Thus, an additional laser is utilized and this light is coupled into the waveguide and has a longer wavelength than the laser light generated by the semiconductor laser. Given a method with adjustments of optimum length spacing, one thereby advantageously proceeds in accordance with both the optimum longitudinal spacing as well as the adjustment to the optimum relative transverse settings or positions. Thus, the laser light generated by an additional laser and coupled into the waveguide is employed both in the longitudinal adjusting step to obtain the optimum longitudinal spacing as well as for the transverse adjusting step.

It is also expedient to provide a beam splitter for receiving light coupled into the waveguide through the coupling optics. The beam splitter branches a portion of that light from the waveguide to a measuring device such as the detector to determine the intensity of the light being detected.

An apparatus for utilization in the method has a first carrier member having a plane or abutting surface forming the reference surface, means for holding the waveguide with the coupling optics attached thereto with the axis of the waveguide and coupling optic extending perpendicular to the abutting surface. The means for holding can be an aperture or passage in the device which receives the waveguide and coupling optic and allows displacement of the waveguide and coupling optic along the axis of the passage relative to the reference plane. The abutting surface can receive a reflecting surface if an auxiliary reflecting surface is utilized. If a facet of the semiconductor laser is utilized as a reflecting surface, then a second carrier member having the semiconductor laser fixed therein with its facet being in a second abutting surface of the carrier member. Thus, when the two abutting surfaces are brought together, the facet will lie in the reference surface.

Preferably, both of the first and second carrier members are designed as cylindrical members having the same diameter with respect to the end face forming the abutting surface. The first carrier member has a longitudinal bore forming a guide channel of the means for holding the waveguide and the central longitudinal bore has a central recess or counterbore adjacent the abutting surface. The second carrier member has a centrally disposed recess for receiving the semiconductor laser.

Other advantages and improvements of the invention will be apparent from the description of the Figures and the preferred embodiments.

BRIEF DESCRIPTION OF THE DRAWINGS

In FIG. 4, the direction in the transverse plane is perpendicular to the laser-active layer and in FIG. 5, the direction is parallel to the layer of laser-active material with curve II being when the laser is utilized as a detector and curve III being when the laesr is utilized as a transmitter;

FIG. 6 is a cross-sectional view with portions in elevation for purposes of illustration of two carrier members used as an apparatus for performing the method of the present invention;

FIG. 7 is a cross-sectional view of the apparatus of FIG. 6 with the two carrier members being in the engaged position.

DESCRIPTION OF THE PREFERRED EMBODIMENTS

The principles of the present invention are particularly useful for a method for positioning the end of an optical waveguide LWL relative to a laser diode LD2. As illustrated, the optical waveguide LWL is composed of a monomode fiber which at the right-hand end has a coupling optics T which is formed of a fiber taper with a refractive lens attached thereto.

As schematically illustrated, the fiber taper T with the reflective lens faces the schematically indicated facet SF of the laser diode LD2 to which the taper T is to be adjusted. The facet SF is disposed in the defined reference plane RE.

Figure 1:
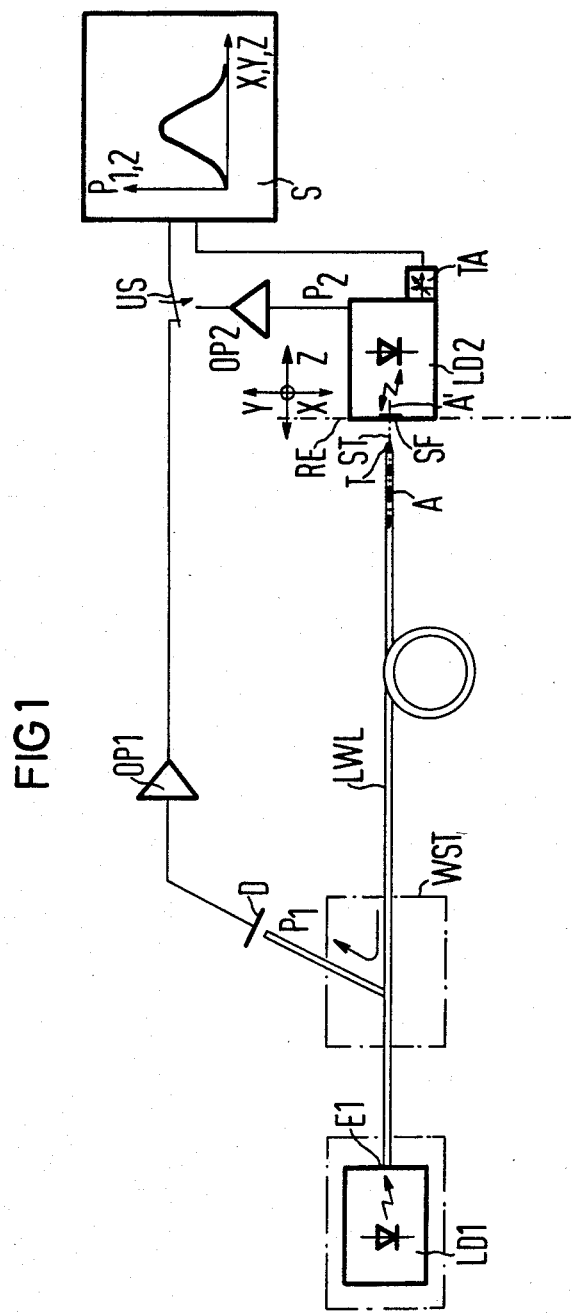
FIG. 1 is a schematic illustration of an apparatus for implementing the method in accordance with the present invention.

The structure according to FIG. 1 is suited both for the method with mutually independent adjustments in the longitudinal direction along the axis A of the optical fiber adjacent the optical coupling formed by the taper T which is a z direction. It is also usable for displacement in the two mutually perpendicular directions x and y which lie in a plane which is perpendicular to the direction z and the axis A.

The location of the laser diode LD2 in the three mutually perpendicular directions x, y and z can be respectively sensed by a sensor Ta for registration by means of a writing means S.

For the purpose of measuring the light power or intensity of the light coupled into the monomode fiber LWL proceeding from the laser diode LD2 via the fiber taper with the refractive lens, a monomode beam splitter WST is provided in the monomode fiber LWL. A proportional component of the light power or intensity of this in-coupled light is thus capable of being laterally coupled out by the monomode beam splitter WST and is supplied to the opto-electrical detector D. The detector D converts this component of light power into a corresponding electrical signal which, for example, is amplified by an operational amplifier OP1 and is thus supplied to the write means S for registration. Thus, the write means S will plot P, which is the light power or intensity versus displacement in any one of the selected the x, y and z directions.

For the cases I and II in which the laser diode is inactive and is employed either as a mirror (case I) or respectively is passively employed as a detector (case II), an additional laser diode LD1 is provided at a point spaced from the taper T such as at the other end E1 of the monomode fiber LWL. Thus, the additional or second laser diode LD1 is at the lefthand end as illustrated in FIG. 1. The laser light of this additional laser diode LD1 is coupled into the monomode fiber 5 at the other end E1 and is supplied via the fiber taper T with the lens to the laser diode LD2.

In case I, wherein the laser diode LD2 is inactive and the facet SF of the diode is employed as a mirror for the light supplied via the fiber taper T with the lens, the power or intensity of the light, which is reflected back by the facet SF and coupled into the monomode fiber LW1 via the fiber taper T and thus the component of the power coupled out by the monomode beam splitter WST to the detector D, is also a maximum when the beam waist of the light focused by the lens of the fiber taper T lies in the reflecting surface of the facet SF which defines the reference plane RE indicated by dot-dash lines. The light rays supplied from the fiber taper T to this reflecting surface of the facet SF which defines the reference plane RE is then reflected back onto itself and the light reflected back is optimally coupled into the monomode fiber LWL.

When the aperture losses, during coupling between the laser diode LD2 and the fiber taper T do not dominate, then the longitudinal spacing measured in the longitudinal direction z for optimum coupling-in of the laser light into the monomode fiber LWL coincide with the optimum longitudinal spacing $z_{OSp}$ between the reference plane RE and the fiber taper T when this spacing $z_{OSp}$ is obtained, the light power coupled back into the monomode fiber LWL becomes maximum. This adjustment method is thereby suited for adjusting the optimum longitudinal spacing $z_{OSp}$ in the z direction between the laser diode LD2 and the taper T with lens.

The adjustment in the longitudinal direction can also be executed with the reflecting auxiliary surface. This is accomplished by placing a reflective auxiliary surface in the reference plane RE which is illustrated in FIG. 1 as the plane of the facet SF. When an optimum spacing $z_{OSp}$ is found, the maximum intensity of reflected light coupled back into the waveguide will occur.

After the optimum longitudinal spacing $z_{OSp}$ has been found, the adjustment in the transverse direction, i.e., in the x and/or y direction, must also be obtained. This can be done by two different methods.

The first method is a standard method in which the laser diode LD2 is operated as a laser and thus as a transmitter, which is the case III operation, and the adjustment to the maximum light power coupled into the monomode fiber LWL via the fiber taper T is measured. The component $P_1$ of this light power coupled out at the beam splitter WST is measured at the detector D with the output of the detector D being supplied through the amplifier OP1 to the write means S.

In the other or second method, the laser diode LD2 is passively operated as a detector and light from an additional laser diode LD1 is supplied via the monomode fiber LWL and the taper T to the detector. This is case II. The supplied light power is converted by the laser diode LD2 acting as a detector into a corresponding electrical signal $P_2$ which, for example, is amplified by an operational amplifier OP2 and is supplied to the write means S for registration. In order for the signals from the detector LD2 and the opto-electrical detector D to be optionally supplyable to the writing means S, a changeover means or switch US is provided. In one position for the changeover means US, an electrical connection between the detector D and the write means S is obtained while in the other position the laser diode LD2 is connected to the write means S.

For the execution of measurements given the structure according to FIG. 1, two different fiber tapers R2 and R6 with refractive lenses as well as two BH laser diodes HLP 5400 of the Hitachi Company were utilized. The important parameters of the laser diodes and of the different fiber tapers R2 and R6 as well as the results of the measurements are compiled in the following Tables:

| TABLE FOR TAPER R2 | | |
|---|---|---|
| Far field angle $\Theta_{(FWHM)}$ | | 8.4° |
| | Case III | Case II |
| $\Delta x_{1dB}$ [μm] | ± 1 | ± 1.1 |
| $\Delta z_{1dB}$ [μm] | + 11.3 | + 9.7 |
| | − 6 | − 6.8 |
| $\Delta x_{3dB}$ [μm] | ± 1.7 | ± 1.9 |
| wherein: | | |
| $z_{OSp}$ [μm] | | 43.4 |
| $z_{OD}$ [μm] | | 38.1 |
| $z_{OS}$ [μm] | | 38.9 |
| $\Delta \eta$ (transmitter) given $z_{OSp}$ [%] | | 4.1 |
| Refractive index of the lens of the taper | | 1.46 |
| Lens radius of the lens in μm | | 20. |

| TABLE FOR TAPER R6 | | |
|---|---|---|
| Far field angle $\Theta_{(FWHM)}$ | | 20.7° |
| | Case III | Case II |
| $\Delta x_{1dB}$ [μm] | ± 0.5 | ± 0.5 |
| $\Delta z_{1dB}$ [μm] | + 3.7 | + 4 |
| | − 2.7 | − 3 |
| $\Delta x_{3dB}$ [μm] | ± 0.9 | ± 0.8 |
| wherein: | | |
| $z_{OSp}$ [μm] | | 16.1 |
| $z_{OSp}$ [μm] | | 14 |
| $z_{OD}$ [μm] | | 14.5 |
| $\Delta \eta$ (transmitter) given $z_{OSp}$ [%] | | 2.8 |
| Refractive index of the lens of the taper | | 1.82 |
| Lens radius of this lens in μm | | 13 | wherein in the above Tables the following are defined:
$\Delta x_{1dB}$ is the lateral tolerance at which the power decreases by 1 dB;
$\Delta z_{1dB}$ is the axial tolerance at which the power decreases by 1 dB;
$\Delta x_{3dB}$ is the lateral tolerance at which the power decreases by 3 dB;
$z_{OSp}$ is the optimum longitudinal spacing identified in case I;
$z_{OD}$ is the optimum longitudinal spacing identified in case II;
$z_{OS}$ is the optimum longitudinal spacing identified in case III; and
$\Delta \eta$ is the deviation of the coupling efficiency identified in case I given optimum longitudinal spacing $z_{OSp}$ from the coupling efficiency that is maximally attainable in case III, i.e., given a laser diode LD2 operates as a transmitter.

Figure 2:
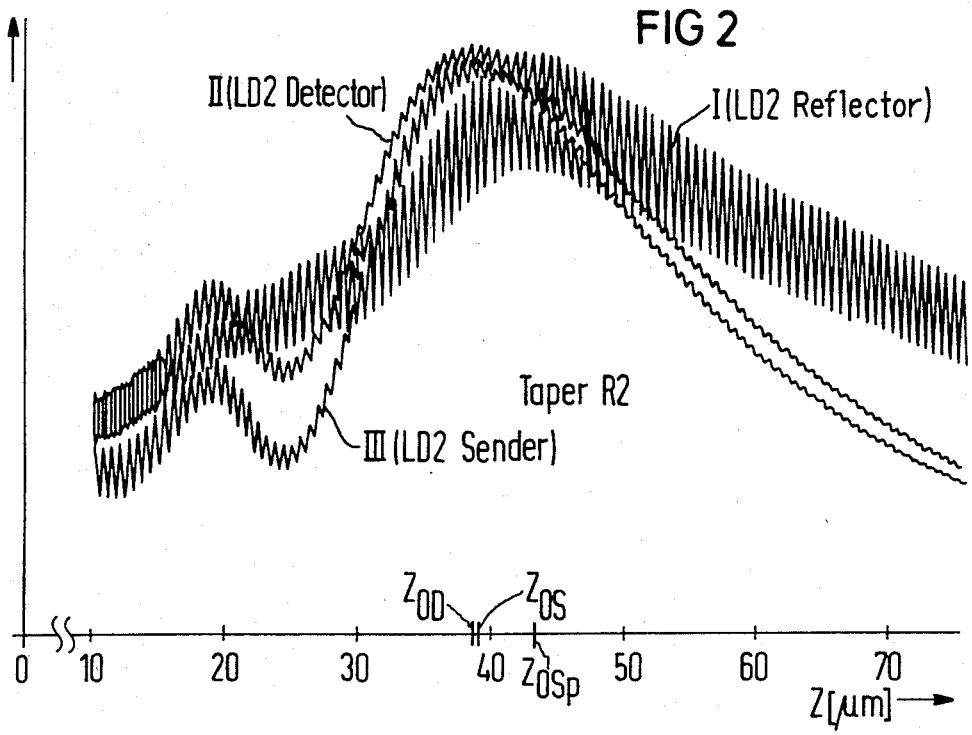
FIG. 2 is a graphic presentation of power or intensity of light measured for a specific fiber taper as a function of the longitudinal spacing along the longitudinal direction z of a monomode fiber having a taper from the semiconductor laser with curve I being developed when the laser diode is utilized as a reflecting surface; curve II being developed when the laser diode is employed as a detector and curve III being developed when the laser diode is employed as a transmitter.
Figure 3:
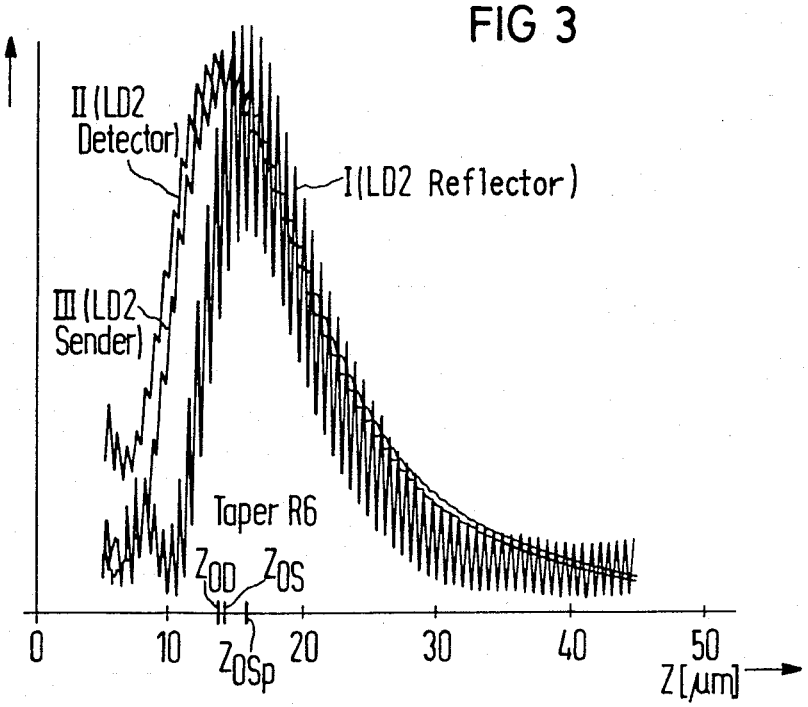
FIG. 3 is a graphic presentation of light power or intensity for a different fiber taper on the waveguide as a function of the longitudinal spacing z wherein curves I, II and III are for the same three conditions for the laser diode as in FIG. 2.

FIGS. 2 and 3 show the dependency of the light powers $P_1$ or $P_2$ measured with the taper R2 or, respectively, R6, on the longitudinal spacing measured in the z direction between the taper T with the lens and the laser diode LD2 for the three cases I, II and III wherein the different curves I, II and III in FIGS. 2 and 3 are allocated to the different tapers. The periodic amplitude fluctuations obtained in the curves I, II and III, which are also referred to as "ripples", are caused by the Fabry-Perot resonator which is formed by the lens of the taper T and the reflecting surface formed by the facet SF of the laser diode LD2. The distance between the adjacent minima and maxima of the periodic fluctuations respectively amounts to $\lambda/4=0.325$ μm when the laser diode is employed.

Given the two tapers R2 and R6, the optimum longitudinal spacing $z_{OD}$ (case II) in which the $P_2$ becomes maximum and the optimum longitudinal spacing $z_{OS}$ (case III) at which the $P_1$ becomes maximum coincide except for a difference of $(z_{OS}-z_{OD})\leq 0.9$ μm. Given a noticeable fluctuation, $z_{OD}$ was always smaller than $z_{OS}$.

A somewhat greater optimum longitudinal spacing $z_{OSp}$ is obtained for case I wherein the adjustment occurs with the laser diode as a mirror. The difference between $z_{OSp}-z_{OS}$, however, becomes smaller when a better fiber taper T is utilized. A better taper is a taper with either a greater aperture or far field angle $\theta_{FWHM}$ and, thus, it has a greater coupling efficiency when the taper is in combination with the semiconductor laser.

Given the taper R6, whose results are illustrated in FIG. 3, the difference $z_{OSp}-z_{OS}\approx 1.6$ μm. An adjustment of the longitudinal spacing with the laser diode LD2 as a mirror would, in this case, result in a misadjustment in the longitudinal direction z of 1.6 μm and, thus, in a decrease in the attainable coupling efficiency by $\Delta \eta \approx 0.2$ dB. Since, however, $z_{OSp}$ is always larger than $z_{OS}$ and the difference $z_{OSp}-z_{OS}$ is roughly fixed and known depending upon the taper and laser type, the deviation can be largely compensated by means of a designational allowance.

Figure 4:
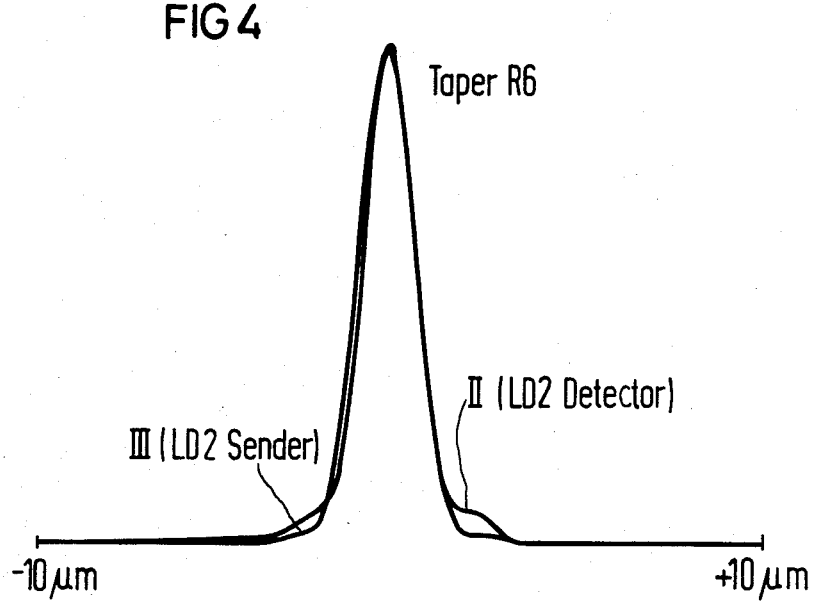
FIGS. 4 and 5 are graphic presentations showing the light power or intensity measurement for the waveguide having the tapers illustrated in FIG. 3 having the optimum longitudinal spacing in the z direction and showing the displacement in a plane transverse to the longitudinal direction along one direction thereof.
Figure 5:
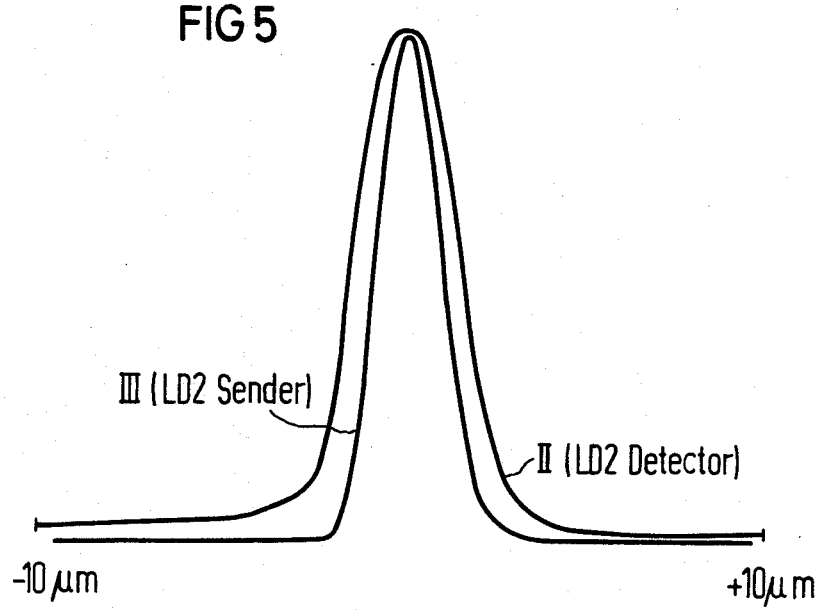

In order to make the adjustments in the transverse direction perpendicular and parallel to the plane of the laser-active layer, the taper R6 was first set to obtain the optimum longitudinal spacing $z_{OSp}$ and upon retention of this longitudinal spacing, the light power $P_1$ for case III or, respectively, $P_2$ for case II was measured as a function of the displacement in the transverse directions. In FIGS. 4 and 5, the identical measured curves for the two transverse directions are illustrated. In FIG. 4, the measurements are in the direction that extends perpendicular to the plane of the laser-active layer while in FIG. 5, the curves are taken in a direction which is parallel to the plane of the laser-active layer. The light power stripped of periodic amplitude flucutations is entered in both Figures as a function of the allocated displacement. When the laser diode LD2 is employed as a detector, then the maximum signal is obtained given an optimally positioned taper T. When the adjustment is in a direction perpendicular to the laser-active layer, the adjustment tolerance for case II, wherein the laser diode is operated as a detector and for case III, wherein the laser diode LD2 is operated as a sender or transmitter, both coincide. The adjustment parallel to the pn-junction of the laser diode is somewhat less sensitive in case II than in case III.

Due to the tolerance of the wavelength of the laser diode, it must be taken into consideration that different wavelengths can be presented for additional laser diode LD1 and the laser diode LD2 at the coupling location. Conditioned by propagation and waveguide properties of the active layer in the laser diode LD2, it must be expected that for the case in which the laser light of the additional laser diode LD1 is of a longer wavelength than the laser light of the laser diode LD2, the adjustment between the fiber taper T and the laser diode LD2 operating as a detector become more sensitive. The value specified in the above two Tables are valid for the case in which the laser light of the additional laser diode LD1 is of a longer wavelength than the laser light of the laser diode LD2.

Let it also be pointed out that somewhat greater spacing than that for the optimum coupling generally occurs given adjustments to the optimum longitudinal spacing with an inactive laser, i.e., in case I. Given known tapers and semiconductor laser properties; however, this difference can be taken into consideration by means of a lead dimension. As already mentioned, it is advantageous during the adjustment in a transverse direction when the additional laser has a somewhat longer wavelength than the semiconductor laser to be coupled on. The suitability of the transverse adjustment investigated here, however, could be dependent on the laser structure. It seems possible with the adjustment method specified here to eliminate some, for example, thermal problems, in the structure of monomode laser modules.

When, alternatively thereto, the method wherein the semiconductor laser LD2 is only passively operated as the detector is utilized, then the adjustment of the coupling optic T to the laser LD2 is undertaken in the same fashion as previously wherein the adjustment in the longitudinal direction z and the adjustment in the transverse directions x and y are mutually dependent and the optimum fiber position, i.e., the optimum longitudinal spacing $z_{OSp}$ and at the same time the optimum relative transverse positions must be found by means of alternating adjustment in the longitudinal and transverse direction. To that end, the facet SF of the semiconductor laser LD2 is irradiated with laser light, which is coupled from the additional laser LD1 into the monomode fiber LWL and has been coupled out via the coupling optic T. The output signal $P_2$ of the semiconductor laser LD2, which is passively operated as a detector, will correspond to the light power detected by the semiconductor laser LD2 and is optimized by means of the relative dislocation in the three directions x, y and z.

The exemplary apparatus illustrated in FIGS. 6 and 7 for the implementation of the method described above is composed of a first carrier TK1 for a monomode fiber LW2 which has a taper T and of a second carrier TK2 for the laser diode LD2 which are separated from one another in FIG. 6 and are shown in axial longitudinal section in both Figures. The first carrier TK1 and the second carrier TK2 are both of a symmetrical configuration. They are employed as sub-carriers for the monomode fiber with the taper and for a laser diode. An end face StF1 or, respectively, StF2 of each of the carriers TK1 and TK2 is employed as an abutting surface. The carrier TK1 for the monomode fiber LW2 with the taper T has means for positioning the waveguide with the taper T, which means is a coaxial bore FK having a diameter corresponding to the diameter of the monomode fiber. The diameter of the bore FK expands adjacent the abutting surface StF1 to a larger diameter and thus forms a recess A1. The recess AL1, which is formed by the expanded longitudinal section of the coaxial bore FK, is created in this abutting surface. In other words, the recess AL1 is a counterbore which is coaxial with the bore FK.

The bore FK has a diameter corresponding to the monomode fiber LW1 and forms a guide channel for this fiber. The fiber with the taper T secured thereto can be axially displaceable in the bore FK relative to the abutting surface StF1. The longitudinal axis of the cylinder or first carrier TK1 essentially coincides with the optical axis A of the fiber LW2 with the taper T attached thereto when positioned in the bore FK.

The planar abutting surface StF1 extends perpendicular to the axis of the first carrier TK1 and thus perpendicular to the optical axis A. The abutting surface thus defines a reference plane RE.

The second carrier TK2 for the laser diode LD2 has the same transverse dimenions as the cylinder forming the first carrier TK1. A recess A2 is likewise formed in its abutting surface StF2 which is likewise planar and proceeds perpendicular to the longitudinal axis of the cylinder. The recess A2, for example, is in the form of a cylindrical blind hole which proceeds coaxially to the longitudinal axis of the cylinder TK2 and, for example, has the same transverse dimensions as the recess A1 in the other cylinder or first carrier TK1.

The laser diode LD2 is disposed or positioned in the recess A2 with its optical axis A' extend parallel to the longitudinal axis of the cylinder TK2 and preferably coinciding therewith, for example, as illustrated in FIG. 6. In addition, the laser diode LD2 is also disposed such that the reflecting surface of the facet SF lies in the plane of the abutting surface StF2 of the cylinder TK2.

For the implementation of the method wherein the adjustment to the optimum longitudinal spacing and the adjustment to the optimum transverse spacing can be undertaken independently of one another, one can proceed such that an auxiliary mirror HS is applied to the abutting surface StF1 for the adjustment of the waveguide or optical fiber LW2 with the taper T to the reference surface RE to obtain the longitudinal spacing $z_{OSp}$. Thus, a reflecting surface rF of the auxiliary mirror HS will face the abutting surface StF1 and also the taper T and the reflecting surface rF lies precisely in the reference plane RE.

The adjustment to the optimum longitudinal spacing $z_{OSp}$ is then undertaken as described above whereby the fiber LW2 is displaced in the bore FK until the optimum longitudinal spacing $z_{OSp}$ is obtained. The expanded recess A1 guarantees an undisturbed light propagation between the taper T and the reflecting surface rF.

When the optimum longitudinal spacing $z_{OSp}$ has been found, the fiber LW2 is fixed in the cylinder or first carrier member TK1 and the auxiliary mirror HS can be removed.

The two carrier members TK1 and TK2 are now brought together such that the abutting faces StF1 and StF2 lie against one another flush as shown in FIG. 7. As a result thereof, the facet SF of the laser diode LD2 lies in the reference plane RE and is thus automatically disposed in the optimum longitudinal spacing $z_{OSp}$ from the taper.

The above-indicated adjustment to the optimum transverse settings occurs in that the two cylinders or members TK1 and TK2 lying against one another at their abutting surfaces are displaced relative to one another. When the optimum transverse settings or positions have also been found, the two members TK1 and TK2 are fixed to one another and the adjustment procedure has been concluded.

When no auxiliary mirror HS is employed in the method, the two members TK1 and TK2 are already placed against one another at the optimum longitudinal spacing during adjustment. Care need merely be exercised to see that the facet SF of the laser diode LD lies at the optical axis A of the monomode fiber LWL. The facet SF will form the mirror. The apparatus according to FIGS. 6 and 7, however, can also be employed for the method wherein the semiconductor layers are also passively operated as a detector. It is advantageous to first undertake a preadjustment with the method wherein an adjustment to the optimum longitudinal spacing and an adjustment to the optimum transverse positions are undertaken independently of one another. Then, for fine-setting, the positions are readjusted to a more precise value with the semiconductor laser being only passively operated as a detector during both the longitudinal as well as the transverse adjustment.

Although various minor modifications may be suggested by those versed in the art, it should be understood that we wish to embody within the scope of the patent granted hereon, all such modifications as reasonably and properly come within the scope of our contribution to the art.

We claim:

1. In a method for adjusting a coupling optic, which is provided at the end of the optical waveguide, for coupling light into a waveguide from a semiconductor laser so that the laser light emitted by the semiconductor laser is coupled to the waveguide via the coupling optic with the optimum coupling efficiency, said method including the steps of longitudinally adjusting the position of the coupling optic in a longitudinal direction extending along the optical axis of the waveguide adjacent the end with the coupling optic from an emitting surface of the laser and transversely adjusting the coupling optic and laser relative to each other in orthogonal directions in a plane extending transverse to the optical axis of the waveguide with each adjusting step including coupling light into the waveguide and coupling optic, measuring the light power of the coupled light and moving the waveguide and coupling optic relative to the laser to obtain an optimum measured value, the improvements comprising performing the step of longitudinal adjusting for the longitudinal spacing first and then the step of transverse adjusting independent of each other; said step of longitudinal adjusting including providing a reference plane extending perpendicular to the optical axis of the waveguide and coupling optic, providing a reflecting surface in the reference plane, projecting light from the waveguide through the coupling optics onto the reflecting surface, measuring the intensity of the reflected light coupled back into the waveguide, adjusting the axial position of the waveguide and coupling optic relative to the reflecting surface to obtain the optimum value, and then fixing the waveguide relative to the reference plane; and the step of transverse adjusting in the orthogonal direction including coupling light into the waveguide and coupling optic by providing an additional source of additional light at a point spaced from the coupling optic, said additional light having a longer waveguide than the light of the semiconductor laser when operated as a laser, coupling the additional light from the additional source into the waveguide to be projected through the coupling optical onto the semiconductor laser, providing detector means to determine the intensity of light traveling in the waveguide by passively operating the semiconductor laser as a detector to detect the intensity of the light being projected thereon, and moving the coupling optic in both orthogonal directions relative to the semiconductor laser to obtain the optimum value for the intensity of the light.

2. In a method according to claim 1, wherein the additional light source is a laser.

3. In a method according to claim 1, wherein the additional light source is coupled to the waveguide at an end opposite the coupling optics.

4. In a method according to claim 1, wherein the additional light source is a laser and is utilized in both the step of transverse adjusting and the step of longitudinal adjusting.

5. In a method according to claim 1, wherein the semiconductor laser has a laser-active layer extending in a plane and the step of transverse adjustings includes adjusting in a transverse direction extending parallel to the plane of the laser-active layer and in a direction extending perpendicular to the plane of the laser-active layer.

6. In a method according to claim 1, wherein the step of providing a reflecting surface provides an auxiliary reflective surface in the reference plane, said auxiliary reflective surface being removed after the optimization of the light power to obtain the longitudinal spacing, then positioning a facet of the semiconductor laser in the reference plane in place of the auxiliary reflective surface and commencing with the transverse adjusting.

7. In a method according to claim 1, wherein the longitudinal adjusting is undertaken with a facet of the inactive semiconductor laser being disposed in the reference plane to act as a reflecting surface, said facet of the semiconductor laser remaining in the reference plane after completion of the longitudinal adjusting.

8. In a method according to claim 3, wherein the additional light source is a laser.

* * * * *